United States Patent [19]
Baynes et al.

[11] Patent Number: 5,797,696
[45] Date of Patent: Aug. 25, 1998

[54] SNAP CONNECTION SYSTEM

[75] Inventors: Ian David Baynes; Michael Thomas Hancock, both of Coventry, England

[73] Assignee: Nastech Europe Limited, Coventry, England

[21] Appl. No.: 706,857

[22] Filed: Sep. 3, 1996

[30] Foreign Application Priority Data

Sep. 8, 1995 [GB] United Kingdom ............... 9518412

[51] Int. Cl.$^6$ ........................................ F16B 7/00
[52] U.S. Cl. ...................... 403/377; 403/326; 403/109; 74/492
[58] Field of Search ........................... 403/375, 376, 403/377, 378, 379, 326, 327, 328, 104, 106, 109; 74/492, 493

[56] References Cited

U.S. PATENT DOCUMENTS

| | | | |
|---|---|---|---|
| 2,266,643 | 12/1941 | Kruse | 403/377 X |
| 2,744,419 | 5/1956 | Chayne | 74/493 |
| 3,316,774 | 5/1967 | Vogelgesang | 74/493 |
| 3,392,599 | 7/1968 | White | 74/492 |
| 3,538,783 | 11/1970 | Butts | 74/492 |
| 3,788,148 | 1/1974 | Connell et al. | 74/492 |
| 4,453,449 | 6/1984 | Hollman | 403/328 X |
| 4,535,645 | 8/1985 | De Bisschop et al. | 403/109 X |
| 4,563,912 | 1/1986 | Parks | 74/493 |
| 5,152,627 | 10/1992 | Arnold | 403/109 |
| 5,509,324 | 4/1996 | Cymbal | 74/492 |

*Primary Examiner*—Kenneth J. Dorner
*Assistant Examiner*—William L. Miller
*Attorney, Agent, or Firm*—Michael H. Minns; Robert F. Palermo

[57] ABSTRACT

In a snap connection system in which a shaft is inserted into a tube to a predetermined position, where co-operating surfaces on tube and shaft engage as in a laterally acting wedge. Two axially spaced spring loaded balls on one side of the tube urge the shaft into wedging engagement with the tube when in the pre-determined position. During insertion, a further spring loaded ball on the opposite side of the tube adjacent the wedge apex urges the shaft out of wedging engagement with the tube. A detent in the shaft accommodates this further ball at the predetermined position, locating the shaft axially and permitting wedging. The balls are biased by a spring sleeve and a tang thereon locates the sleeve on the tube. The tang may extend to the tube interior to coact with a detent in the shaft so that unclipping is necessary for disassembly. Alternatively, a spring loaded pin extending through sleeve and tube wall may accomplish the same end.

16 Claims, 3 Drawing Sheets

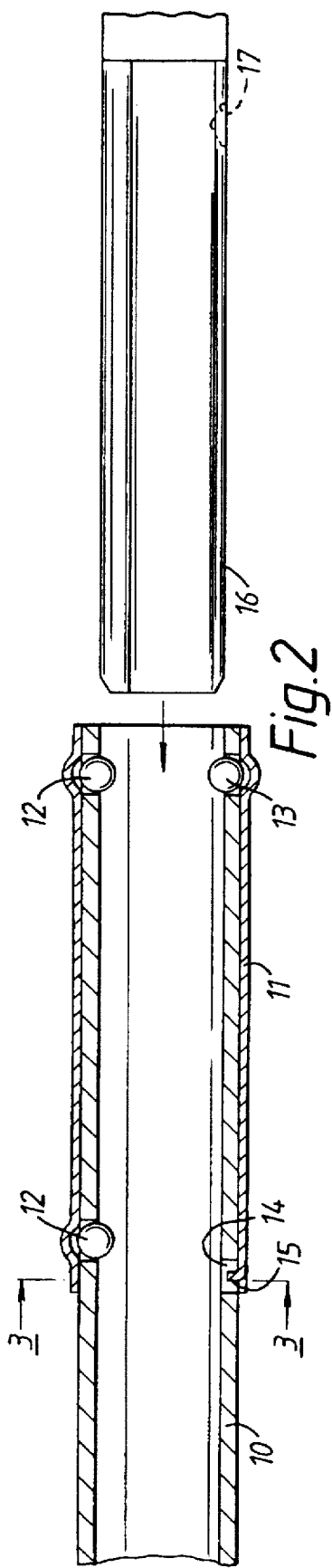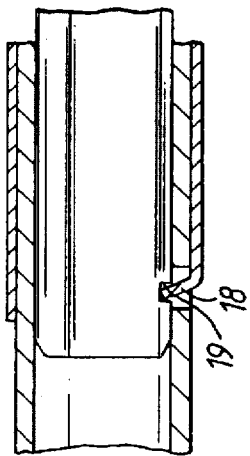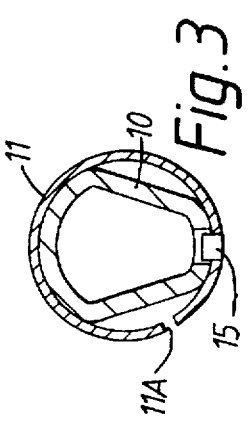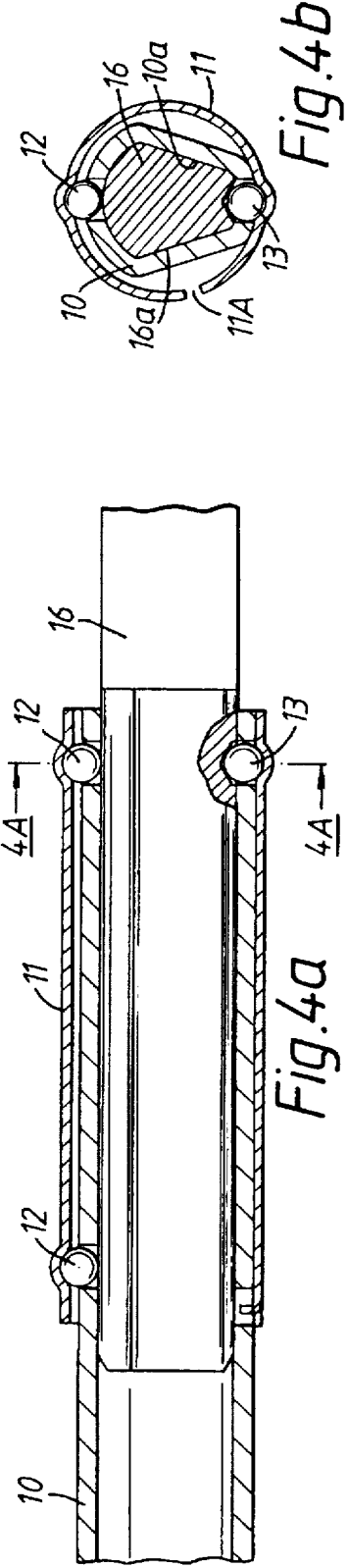

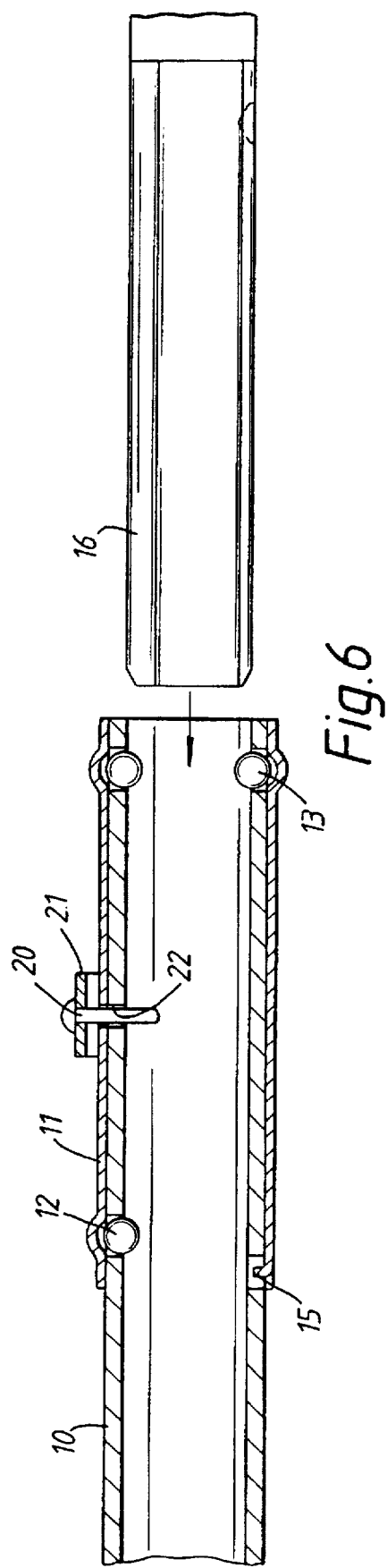
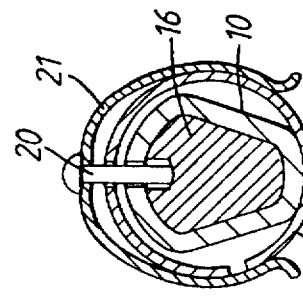
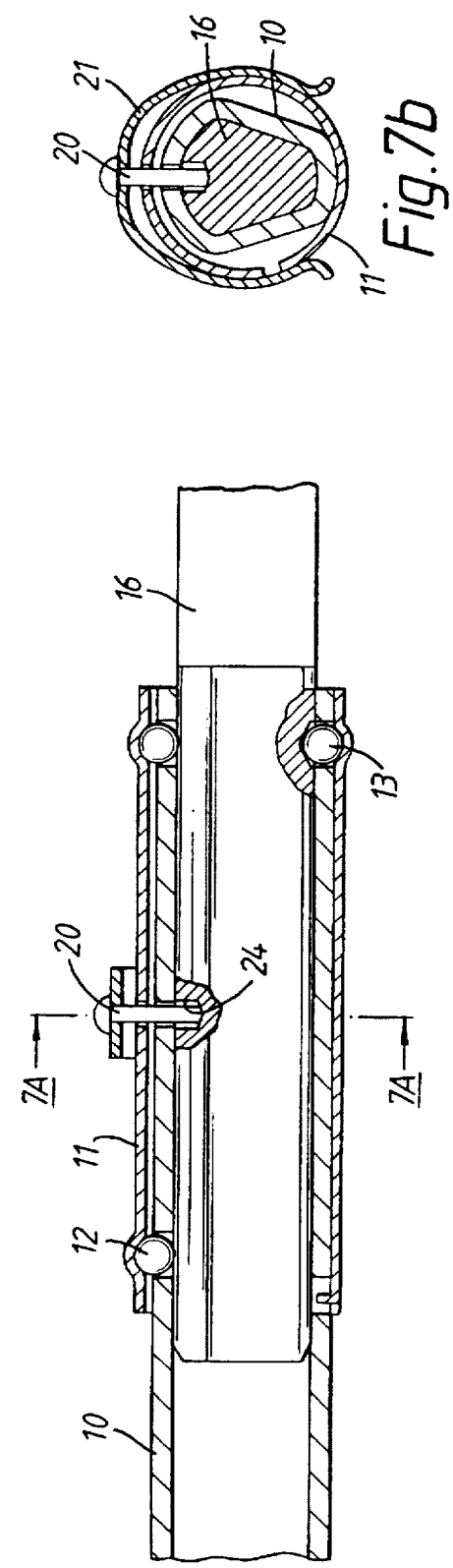

5,797,696

1

SNAP CONNECTION SYSTEM

BACKGROUND OF THE INVENTION

This invention relates to a system permitting two components to be assembled with an automatic snap connection. It has particular, but not exclusive relevance, to situations where no secondary operations, such as fastening by a nut and bolt, are permissible, for example at any position within a steering column and rack assembly.

By suitable design, and taking into account manufacturing tolerances, the system of the invention can enable parts supplied separately by different companies to be easily connected together.

SUMMARY OF THE INVENTION

In one aspect of the present invention, this is accomplished by providing a shaft assembly comprising: a tube; a shaft, the shaft being slidable within the tube; a first means for biasing the tube and the shaft into wedging engagement when the tube and the shaft are in a pre-determined axial position; and a second means for biasing the tube and the shaft out of wedging engagement when the tube and the shaft are not in the pre-determined position.

The foregoing and other aspects will become apparent from the following detailed description of the invention when considered in conjunction with the accompanying drawing figures.

BRIEF DESCRIPTION OF THE DRAWING FIGURES

FIG. 2 shows a first embodiment of the shaft and tube in diagrammatic longitudinal cross-section, not assembled;

FIG. 3 shows the tube of FIG. 2 in transverse cross-section, taken on line 3—3 in FIG. 2;

FIG. 4A shows the shaft and tube of FIG. 2 assembled in the predetermined position, in diagrammatic longitudinal cross-section;

FIG. 4B shows the shaft and tube of FIG. 2 assembled in the predetermined position, in diagrammatic transverse cross-section, the section being on the line 4A—4A;

FIG. 5 shows a variation in the form of the tube of FIGS. 2 to 4;

FIG. 6 shows a second embodiment of the shaft and tube in diagrammatic longitudinal cross-section, not assembled;

FIG. 7A shows the assembled tube and shaft of FIG. 6 in diagrammatic longitudinal and transverse cross-section; and FIG. 7B shows the shaft and tube of FIG. 6 in diagrammatic transverse cross-section, the section being on the line 7A—7A.

DETAILED DESCRIPTION

Figure 1:
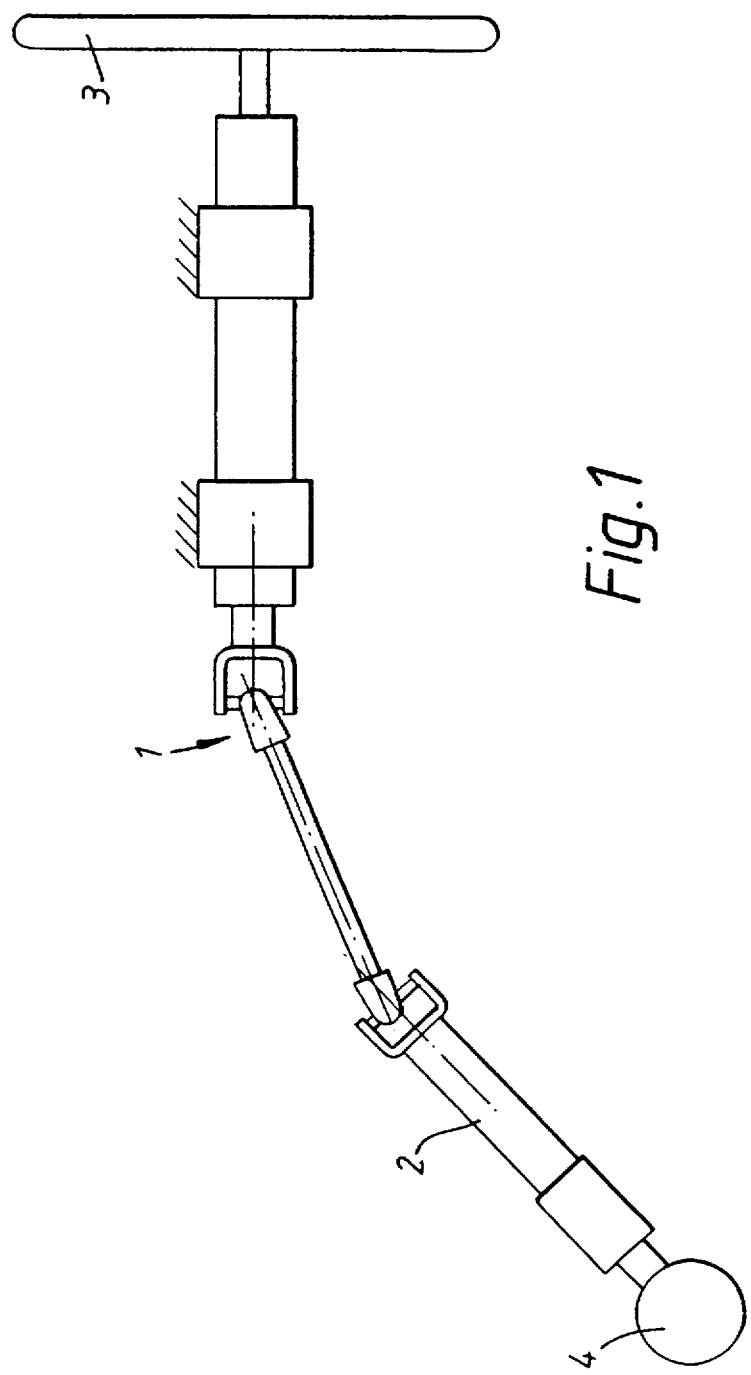
FIG. 1 illustrates a typical example of the use of the snap connection system, for connecting a steering column to a steering rack.

According to the present invention there is provided a snap connection system including a tube, and a shaft for insertion into the tube to a predetermined position, the tube and shaft having cooperating surfaces for engagement as in a laterally acting wedge when in said predetermined position, at least two axially spaced spring loaded first biasing members being provided in a first axially extending portion of the tube and/or shaft opposite an apex of the wedge and arranged for urging the shaft into wedging engagement with the tube, and at least one spring loaded second biasing member provided in a second axially extending portion of the tube and/or shaft adjacent the wedge apex for urging the shaft out of wedging engagement with the tube, wherein the or each second biasing member counters the action of the first biasing members, to facilitate insertion of the shaft into the tube, and wherein the shaft and/or tube is provided with at least one detent for accommodating the or each second biasing member respectively, when said predetermined position is reached, thereby to locate the shaft axially thereat and to permit the wedging action to occur under the influence of the first biasing members as a snap connection.

Preferably the first and second biasing members are rotatable in a sense facilitating insertion of the shaft into the tube, and withdrawal, for example spring loaded balls.

FIG. 1 shows a steering column 1, which includes an intermediate shaft 2 and serves to couple a steering wheel 3 to a steering rack 4. As shown, the intermediate shaft 2 and the steering rack 4 are formed as a shaft and tube (or tube and shaft) and may thus be coupled by an automatic snap connection requiring no ancillary coupling operation(s).

FIGS. 2 to 4 show a first embodiment in which a tube 10 is provided with an outer spring sleeve 11 which is split at 11A and is shaped and located so as to bias two upper balls or rolling members 12 and a lower ball or rolling member 13 inwardly of the tube, each ball being accommodated within an aperture in the tube wall. A further aperture 14 in the tube wall serves to locate an inwardly directed tang 15 of the spring sleeve 11, formed for example by turning a portion of the end of the sleeve 11, and so prevent axial or rotational displacement of the sleeve 11. The spring sleeve 11 could be of circular (annular) section, as shown, and need not conform to the whole periphery of the tube 10.

A shaft 16 for insertion within the tube 10 is provided with an indentation or hole 17 acting as a detent. As shown in the transverse cross-section of FIG. 4, the shaft 16 is of "V" formation providing two mutually inclined lateral wedging surfaces 16a, and its outer surface in the region where wedging is intended to occur closely conforms to the internal surface 10a of the tube 10, which is also of "V" formation, it being understood that sufficient clearance is provided to enable insertion of the shaft 16 into the tube 10.

On insertion of the shaft 16, the lower ball 13 biases the wedging surfaces 16a away from the tube 10, against the action of the upper balls 12. These opposing biases suspend the shaft 16 within the tube 10 so that it can be slid into the predetermined position in which the lower ball 13 nests in the indentation 17 of the shaft. The biasing force of the upper balls 12 is then no longer balanced by the lower ball 13, and the shaft 16 achieves wedging engagement with the tube 10 due to that unbalanced bias. Without this feature, the wedging action would be increased by the upper balls 12, and insertion of the shaft 16 would require increased force and generally be more difficult.

When the shaft 16 has been inserted to a predetermined position, the lower ball 13 snaps into the detent 17 in the shaft 16, thereby tending positively to locate the shaft 16 axially relative to the tube 10. Such location is reinforced by the biasing action of the upper balls 12, which now act, free of any restraint from the lower ball 13, to wedge shaft 16 and tube 10 together and so increase frictional forces therebetween. This wedging action means that there is no backlash and rattle due to bending forces when the tube and shaft are assembled.

If the shaft 16 needs to be inserted a significant distance within the tube 10, an additional lower ball or balls may be provided, axially spaced from the first, with corresponding detents in the shaft 16.

Disassembly is normally possible using a higher force than used during assembly.

In FIG. 5, the tang 15 is replaced or supplemented by a longer tang or barb 18, which extends into the tube interior and is inclined in the direction of insertion of the shaft 16. The latter is provided with a detent 19 which engages the tang 18 when the shaft 16 is in the predetermined position. In this case, disassembly requires the tube 10 and shaft 16 to be positively unclipped.

FIGS. 6 and 7 show a second embodiment which is generally similar to the first, but includes a retention pin 20 which extends through the spring sleeve 11 and a hole 22 in the wall of the tube 10 and which is spring loaded by a spring clip 21. The pin 20 lifts, or is lifted, and the clip 21 flexed, when the shaft 16 is inserted into the tube, and snaps into a hole 24 in the shaft when the predetermined position is reached. Positive withdrawal of the pin 20 may be necessary for disassembly.

It will be understood that although the biasing members are shown as balls, and are located in apertures in the tube wall, it would be equally possible for some or all of them to have a different form, e.g. rollers, and to be located in apertures in the shaft (with the aperture for the snap location ball formed in the tube).

Having described the invention, what is claimed is:

1. A shaft assembly comprising:
    a tube having a spring sleeve mounted externally thereon, said spring sleeve having an inwardly extending tang engaging an aperture in said tube
    a shaft slidable within the tube;
    a first means for biasing the tube and the shaft into wedging engagement when the tube and the shaft are in a predetermined axial position; and
    a second means for biasing the tube and the shaft out of wedging engagement when the tube and the shaft are not in the pre-determined position.

2. The shaft assembly according to claim 1, wherein the first and second biasing means bias the tube and the shaft transversely to an axis common to the tube and the shaft.

3. The shaft assembly according to claim 1, wherein the tube and the shaft have complementary interengaging wedge shaped surfaces.

4. The shaft assembly according to claim 1, wherein the first means for biasing comprises a plurality of axially spaced apart spring loaded first rolling members.

5. The shaft assembly according to claim 1, wherein the second means for biasing comprises at least one spring loaded second rolling member.

6. The shaft assembly according to claim 5, further comprising:
    a detent provided in one of the shaft or the tube for accommodating the at least one second rolling member when the tube and the shaft are in the pre-determined position.

7. The shaft assembly according to claim 1, wherein the first means for biasing comprises a plurality of axially spaced apart spring loaded first rolling members, the second means for biasing comprises at least one spring loaded second rolling member, and the at least one second rolling member is positioned to transversely oppose at least one of the first rolling members.

8. The shaft assembly according to claim 1, wherein the shaft has a detent therein and the inwardly extending tang is inclined in a first axial direction, the tang engaging the tube aperture and when the tube and the shaft are in the pre-determined positioned, the tang engaging the shaft detent.

9. A shaft assembly comprising:
    a tube;
    a spring sleeve mounted externally on the tube, said spring sleeve having an inwardly extending tang engaging an aperture in said tube;
    a shaft, the shaft being slidable within the tube;
    a plurality of axially spaced apart spring loaded first rolling members provided in a first axially extending portion of one of the tube or the shaft; and
    at least one spring loaded second rolling member positioned transversely opposite one of the first rolling members in a second axially extending portion of one of the tube or the shaft; and
    a detent provided in one of the shaft or the tube for accommodating the at least one second rolling member when the tube and the shaft are in a pre-determined axial position.

10. A snap connection system comprising:
    a tube;
    a shaft for insertion into the tube to a pre-determined position, said tube and said shaft having co-operating surfaces for engagement as a laterally acting wedge when the tube and the shaft are in said pre-determined position;
    at least two axially spaced spring loaded first biasing members being provided in a first axially extending portion of one of the tube or the shaft opposite an apex of the wedge and arranged for biasing the shaft into wedging engagement with the tube; and
    at least one spring loaded second biasing member provided in a second axially extending portion of one of the tube or the shaft adjacent the wedge apex for urging the shaft out of wedging engagement with the tube, wherein the at least one second biasing member counters the action of the first biasing members to facilitate insertion of the shaft into the tube, and wherein one of the shaft or the tube is provided with at least one detent for accommodating the at least one second biasing member when said predetermined position is reached, thereby to locate the shaft axially thereat and to permit the wedging action to occur under the influence of the first biasing members as a snap connection.

11. The system according to claim 10, wherein the first and second biasing members are rolling members.

12. The system according to claim 11, wherein the rolling members are spring loaded balls.

13. The system according to claim 10, wherein the first and second biasing members are mounted in the tube.

14. The system according to claim 13, wherein the first and second biasing members are spring loaded by a spring sleeve mounted externally on the tube.

15. The system according to claim 14, wherein the spring sleeve is retained on the tube by a tang extending into an aperture in the tube wall.

16. The system according to claim 15, wherein the tang extends into the interior of the tube, and is inclined in the direction of insertion of the tube, and the shaft includes a detent which engages the tang when the tube and the shaft are in the predetermined position.

* * * * *